Figure 1:
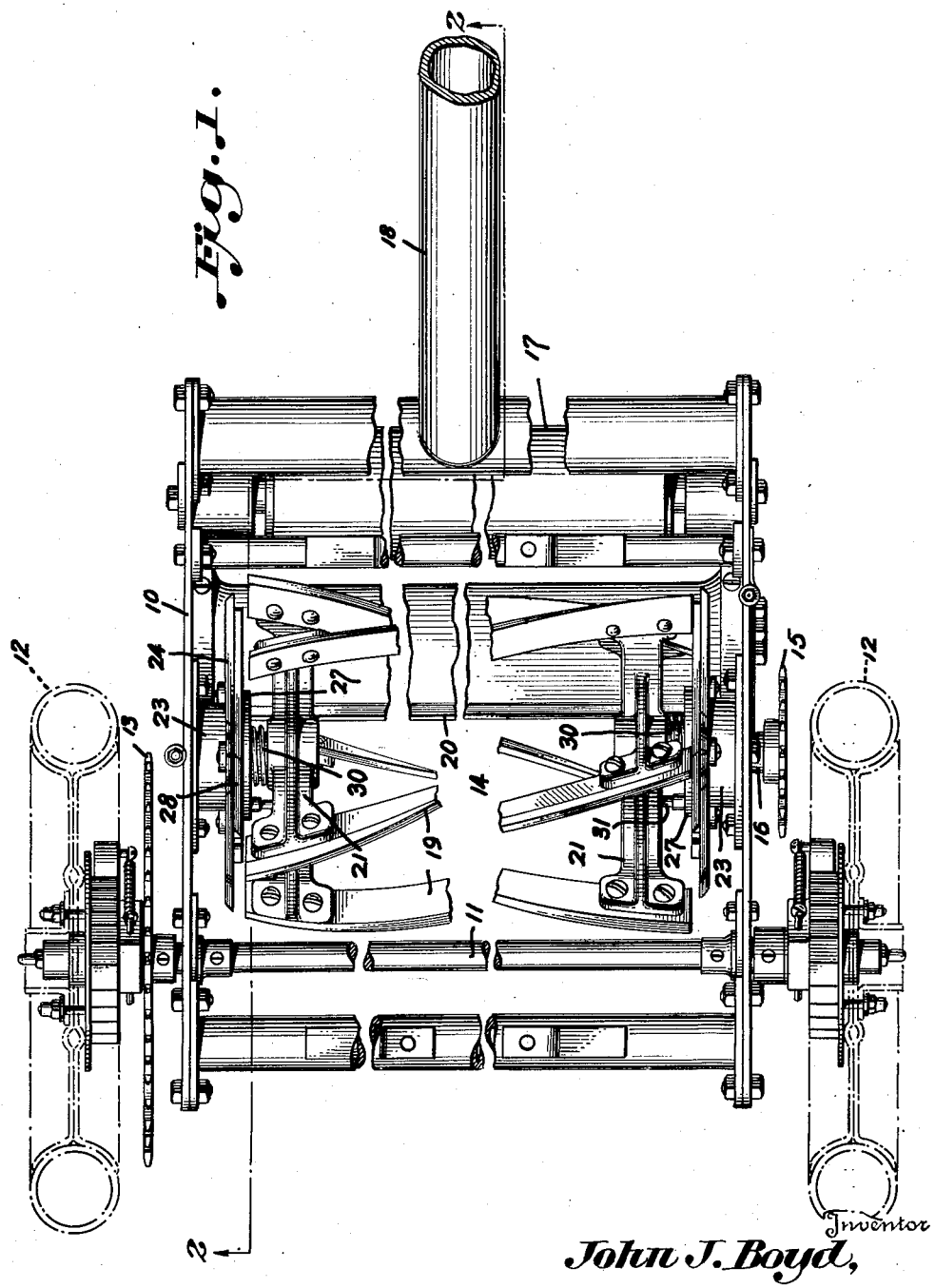

Aug. 8, 1950  J. J. BOYD  2,517,834
LAWN MOWER

Filed Feb. 16, 1948  3 Sheets-Sheet 2

John J. Boyd, Inventor

By [signature], atty.

Aug. 8, 1950     J. J. BOYD     2,517,834
LAWN MOWER

Filed Feb. 16, 1948     3 Sheets-Sheet 3

John J. Boyd, Inventor atty.

Patented Aug. 8, 1950

2,517,834

UNITED STATES PATENT OFFICE 2,517,834

LAWN MOWER

John J. Boyd, Brookmont, Md.

Application February 16, 1948, Serial No. 8,578

5 Claims. (Cl. 56—251)

This invention is a mowing machine and has particular reference to lawn mowers.

The primary object of the invention is to provide a mowing machine of such construction as to obviate the possibility of foreign material becoming engaged with the reel of the machine and to prevent clogging or jamming of the reel or to impair its operation.

A further object of the invention is to provide a mowing machine of that type characterized by a power driven reel, so constructed and arranged as to clear the bearings of the reel of grass, weeds, roots or other such material automatically as the machine advances in its cutting operations.

A further object of the invention is to provide a mowing machine of that type employing the usual power driven reel, and wherein cutting elements are provided adjacent to the bearings of the reel so as to cut grass, weeds, roots or other such material prior to the time such materials come in contact with the bearings, in order that the bearings may be kept free and clear of any such material as might tend to clog or impair the bearing, and further characterized by improved means for insuring at all times proper shearing action of the cutting elements.

A further object of the invention is to provide a mowing machine of the character and for the purposes generally stated which is of simple construction, which involves but few simple and readily assembled parts, which parts are so constructed and coordinated as to minimize the opportunity for wear, breakage or derangement, which parts may be readily assembled upon mowing machines generally and without material change in the construction of such machines, and which will prove highly practical and efficient for the purposes intended.

With the foregoing objects in view, together with others which will appear as the description proceeds, the invention consists in the novel construction, combination and arrangement of parts, all as will be described more fully hereinafter, illustrated in the drawings, and particularly pointed out in the claims.

Figure 2:
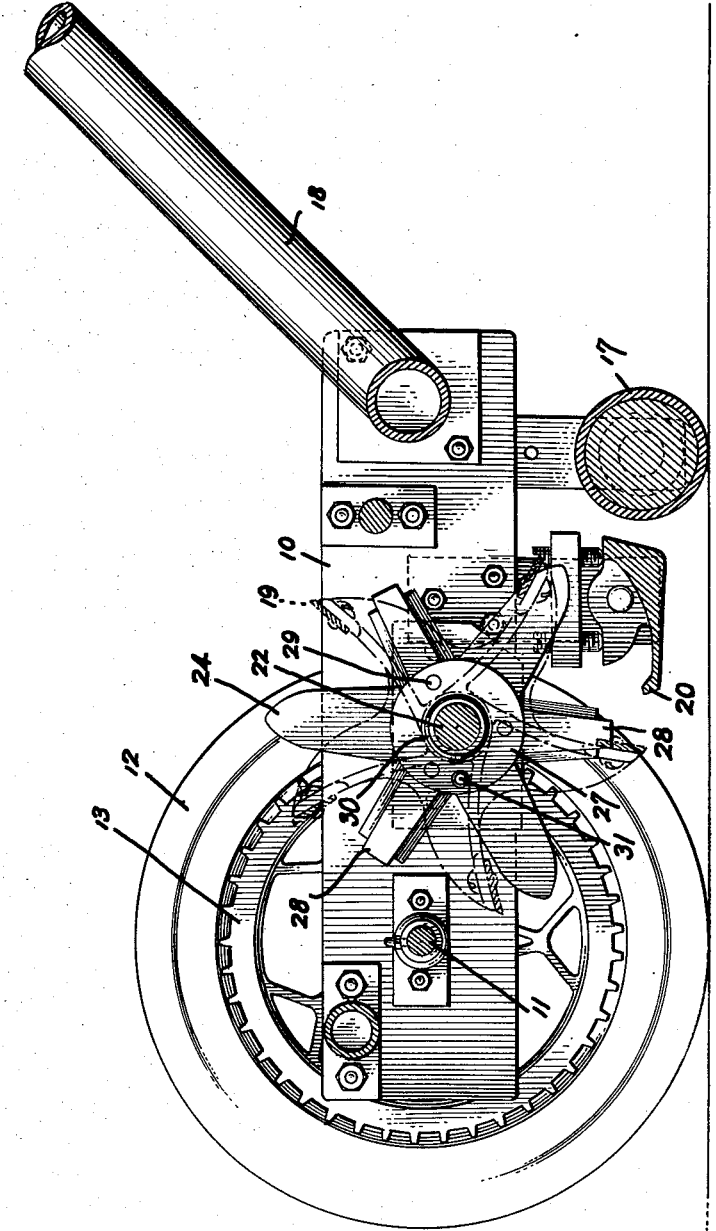
Figure 3:
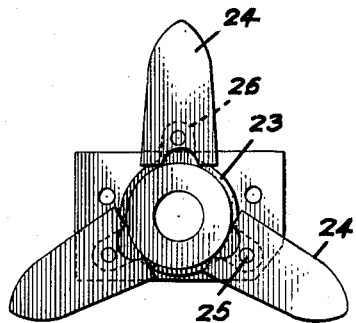
Figure 4:
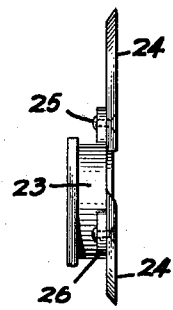
Figure 5:
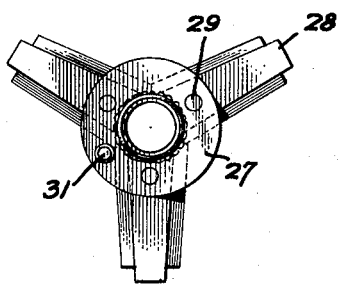
Figure 6:
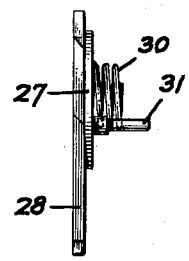
Figure 7:
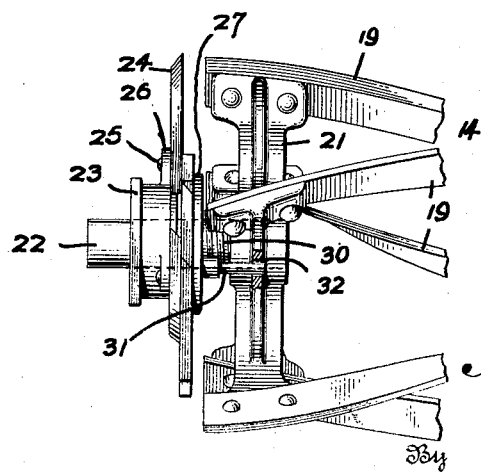

In the drawing:

Fig. 1 is a top plan view, parts broken away, of a mowing machine and illustrating as applied thereto a bearing clearing mechanism involving the invention, Fig. 2 is a transverse sectional view taken substantially upon line 2—2 of Fig. 1, Fig. 3 is an enlarged front elevation of a fixed blade to be used in connection with the mowing machine, Fig. 4 is an edge view of the blade as shown in Fig. 3, Fig. 5 is a view similar to Fig. 3 and illustrating a face view of one of the movable cutter members, Fig. 6 is an edge view of the blade shown in Fig. 5, and Fig. 7 is a view of one end of a conventional form of lawn mower reel and illustrating the cutting elements as applied thereto.

Referring now more particularly to the drawing, the mowing machine here disclosed for the purposes of illustrating the invention embodies side frame members 10 connected at their forward ends by a transversely disposed shaft 11, to the ends of which the ground engaging or supporting wheels 12 are secured. The mowing machine here disclosed is of that type employing a motor for the purpose of driving the machine as well as the movable parts thereof. For the purposes of clarity, the motor is omitted, but it will be understood that power from such source to propel the machine is applied to the traction or ground engaging wheels 12 by means of the sprocket 13, while the cutting reel, represented generally at 14, is rotated through the instrumentality of the sprocket 15 secured to the trunnion or reel shaft 16. The rear end of the frame 10 is supported by the roller 17, and the frame may be steered by the post 18 in the usual manner. The blades 19 of the reel 14 coact with the fixed cutter bar or blade 20 as the mowing machine advances and in a manner well understood.

The machine here disclosed for the purposes of illustrating the invention is referred to as a power driven machine, but it will be understood that the invention may equally as well be employed in connection with mowing machines of that type which are propelled by either pushing or pulling.

The reel 14 is provided at each end with a spider 21 to which the blades 19 are secured, and each spider has an outwardly projecting shaft end or trunnion 22 rotatably engaged and supported in a bearing 23 rigidly secured to the side frames 10 of the machine chassis.

Each of the bearings 23 has secured to and radiating therefrom fixed cutter blades 24, said blades being held rigid with the bearing members by means of pins or rivets 25 extending through bosses 26 carried by the bearings. While there are three blades shown in the present instance, it will be understood that more or less of such blades may be used if desired. It will be observed that the blades 24 are located at the inner end of the bearing, or at that end of the bearing next adjacent to the reel end.

Each of the shaft ends or trunnions 22 has rotatably mounted thereon a plate 27 to which is secured a plurality of radially disposed cutter blades 28, secured to the plate by means of pins or rivets 29. The blades 28 carried by the plate 27 correspond in number and in approximate size with the blades 24 affixed to the bearing, and the cutting edges of the blades 28—24 are arranged in shearing relationship. An expansion spring 30 encircles the trunnion or shaft end 22 at each end of the reel and bears at one end against the adjacent spider 21, the opposite end of each spring engaging its corresponding plate 27. These springs exert tension against the plates 27 so as to maintain the blades 28 in proper shearing relationship with the fixed blades 24.

Each of the plates 27 has projecting inwardly therefrom and in parallelism with shaft 22 a pin 31, said pins extending through openings 32 in the adjacent spider 21.

In operation, as the mowing machine advances, the reel is rotated in the manner described, bringing about a cutting action between the blades 19 of the reel and the fixed blade 20 supported by the machine frame. Any upstanding grass, weeds, roots or other material which might ordinarily become wrapped around or engaged with the trunnions or shaft ends 22 at the bearings 23 will be caught between the fixed blades 24 and the rotating blades 28 and will thus be severed. It will be noted that the location of these cooperating cutting elements is at the inner end of the bearing 23 where ordinarily clogging or obstructing materials accumulate to impair if not damage the machine. In the manner described, all danger of the reel bearings becoming clogged with foreign materials is overcome by the location of the fixed and movable blades operating in the manner described. The tension of the spring 30 is such as to at all times insure proper shearing action between the blades, and the pin 31 is the instrumentality through which driving power is imparted to the rotating blades.

It is apparent that a machine constructed in the manner described will at all times have its reel bearings protected against the ingress of foreign matter which might tend to impair or interfere with the proper operation of the cutter reel.

I claim:

1. In a bearing clearer for a mowing machine, a frame, a power reel carried by said frame, bearings in said frame to support said reel, blades affixed to said bearings in close proximity to the ends of said reel and radiating from said bearings, cutter blades carried by said reel, and means maintaining said cutter blades in shearing relationship with said fixed blades.

2. In a bearing clearer for a mowing machine, a frame, a power reel carried by said frame, bearings in said frame to support said reel, fixed blades carried by said frame in close proximity to the ends of said reel and radiating from said bearings, a plate carried at each end of said reel, shear blades affixed to said plates and radiating therefrom, means on said reel to force said plates with their blades in shearing relationship with said fixed blades, and a drive connection between said reel and said plates.

3. In a bearing clearer for a mowing machine, a frame, a power reel carried by said frame, bearings in said frame to support said reel, blades affixed to said bearings and radiating therefrom, a plate at each end of said reel, blades affixed to said plate and radiating therefrom, a spring on each end of said reel engaging said plates and maintaining the blades thereof in shearing relationship with the said fixed blades, said blades disposed in close proximity to said bearings and the ends of said reel and a power connection between the reel and each of said plates.

4. In a bearing clearer for a mowing machine, a frame, bearings arranged in spaced relationship upon said frame, a reel within said frame, shafts projecting from the ends of said reel and rotatably engaged in said bearings, fixed blades secured to said bearings and radiating therefrom, said blades disposed in close proximity to said bearings and the ends of said reel, a plate freely mounted on each of said reel shaft ends, shear blades radiating from said plates, a spring on each shaft end encircling the latter and bearing at one end against an adjacent plate, the other opposite ends of said springs engaged with said reel, and a pin on each plate connected to the adjacent ends of said reel.

5. In a bearing clearer for a mowing machine, a frame, a power reel, a shaft for said reel, bearings in said frame to support said shaft, a fixed blade secured to said frame in close proximity to said bearing and radiating therefrom, a plate rotatably carried by said shaft, shear blades affixed to said plate and radiating therefrom, a spring carried by said reel and exerting pressure upon said plate to force the blades thereof into shearing engagement with said fixed blades, and a drive connection between said reel and said plate.

JOHN J. BOYD.

REFERENCES CITED

The following references are of record in the file of this patent:

UNITED STATES PATENTS

| Number | Name | Date |
|---|---|---|
| 1,489,868 | Wahl | Apr. 8, 1924 |
| 1,970,827 | Van Kesteren | Aug. 21, 1934 |
| 1,991,305 | Willits | Feb. 12, 1935 |
| 2,051,988 | Eckley | Aug. 25, 1936 |
| 2,185,659 | Chernow | Jan. 2, 1940 |
| 2,403,271 | Erickson | July 2, 1946 |

FOREIGN PATENTS

| Number | Country | Date |
|---|---|---|
| 15,379 | Great Britain | July 20, 1908 |